United States Patent
Kim

(10) Patent No.: US 10,993,480 B2
(45) Date of Patent: May 4, 2021

(54) YOGA CUSHION-PADDED SOCK

(71) Applicants: REXY CO., LTD., Seoul (KR); SUNG HWA TRADING CO., LTD., Seoul (KR)

(72) Inventor: Ju Yeong Kim, Seoul (KR)

(73) Assignees: REXY CO., LTD., Seoul (KR); SUNG HWA TRADING CO., LTD., Seoul (KR)

( * ) Notice: Subject to any disclaimer, the term of this patent is extended or adjusted under 35 U.S.C. 154(b) by 0 days.

(21) Appl. No.: 16/609,542

(22) PCT Filed: Jun. 19, 2019

(86) PCT No.: PCT/KR2019/007392
§ 371 (c)(1),
(2) Date: Oct. 30, 2019

(87) PCT Pub. No.: WO2019/245281
PCT Pub. Date: Dec. 26, 2019

(65) Prior Publication Data
US 2020/0329782 A1 Oct. 22, 2020

(30) Foreign Application Priority Data
Jun. 19, 2018 (KR) .......................... 10-2018-0070398

(51) Int. Cl.
*A41B 11/00* (2006.01)

(52) U.S. Cl.
CPC ............ *A41B 11/007* (2013.01); *A41B 11/008* (2013.01); *A41B 2400/20* (2013.01); *A41B 2400/80* (2013.01)

(58) Field of Classification Search
CPC ...... A41B 11/007; A41B 11/008; A41B 11/00; A41H 42/00
(Continued)

(56) References Cited

U.S. PATENT DOCUMENTS

| 1,597,934 | A | * | 8/1926 | Stimpson | ............. | A41B 11/007 |
| | | | | | | 36/3 A |
| 5,960,565 | A | * | 10/1999 | Lochbaum | ............. | A43B 13/12 |
| | | | | | | 36/11.5 |

(Continued)

FOREIGN PATENT DOCUMENTS

| KR | 10-2011-0008842 A | 1/2011 |
| KR | 30-0837396 S | 2/2016 |
| KR | 10-2018-0011573 A | 2/2018 |

OTHER PUBLICATIONS

Korean Office Action for corresponding Korean application No. 10-2018-0070398 dated Mar. 4, 2019.
(Continued)

*Primary Examiner* — Timothy K Trieu
(74) *Attorney, Agent, or Firm* — Hauptman Ham, LLP

(57) ABSTRACT

The present invention relates to a yoga cushion-padded sock in which a cushion pad is attached through mold pressing instead of needlework so as to adjust a thickness of the cushion pad and to simultaneously attach the cushion pad to both sides or one side. Particularly, as a yoga-exclusive sock, the cushion pad is attached to a part of a frictional surface during yoga moves so as to strengthen grip with a floor and complexly provide a shock absorption function and a non-slip quality, and the cushion pad includes air holes to be smoothly ventilated.

2 Claims, 5 Drawing Sheets

(58) Field of Classification Search
USPC .................. 2/239, 240, 241; 36/55, 24.5, 92
See application file for complete search history.

(56) References Cited

U.S. PATENT DOCUMENTS

| | | | |
|---|---|---|---|
| 7,107,626 B1 | 9/2006 | Andrews | |
| 8,984,669 B2* | 3/2015 | Song | A41B 11/007 |
| | | | 2/239 |
| 9,609,896 B2* | 4/2017 | Crosby | A43B 13/22 |
| 10,485,289 B2* | 11/2019 | Frank | A43B 13/22 |
| 2014/0298569 A1* | 10/2014 | Lee | A61H 7/001 |
| | | | 2/239 |
| 2015/0047103 A1* | 2/2015 | Dahlgren | A41B 11/02 |
| | | | 2/239 |

OTHER PUBLICATIONS

Korean Decision to Grant Patent dated Jun. 3, 2019, in connection with the Korean Patent Application No. 10-2018-0070398.

* cited by examiner

YOGA CUSHION-PADDED SOCK

CROSS-REFERENCE TO RELATED APPLICATION

The present application is a national stage filing under 35 U.S.C § 371 of PCT application number PCT/KR2019/007392 filed on Jun. 19, 2019 which is based upon and claims the benefit of priority to Korean Patent Application No. 10-2018-0070398, filed on Jun. 19, 2018, in the Korean Intellectual Property Office, which is incorporated herein in its entirety by reference.

TECHNICAL FIELD

The present invention relates to a yoga cushion-padded sock in which a cushion pad is attached through mold pressing instead of needlework so as to adjust a thickness of the cushion pad and to attach the cushion pad to both sides or one side. Particularly, as a yoga-exclusive sock, the cushion pad is attached to a part of a frictional surface during yoga poses so as to strengthen grip with a floor and complexly provide a shock absorption function and a nonslip quality, and the cushion pad includes air holes to be smoothly ventilated.

BACKGROUND ART

Generally, since yoga or Pilates, which are popular as healing exercise, are forms of indoor exercise and need stability and maintenance in posture and the like, mobility of toes is important and it is necessary to practice yoga with bare feet in order to prevent feet from slipping and to be balanced. As described above, yoga or Pilates is a bare-foot exercise in which it is important to support feet to not slip in order to maintain a pose. During such exercise activities, socks are not worn and a yoga mat and the like are utilized to prevent contamination caused by exercise with a great deal of contact with feet.

However, yoga socks have been on the market due to grip with a floor, contamination of feet, and inconvenience of exercising in the winter caused by cold feet. Recently, most popularly known yoga socks are formed as toe socks having a single-side nonslip structure.

Since there is a limitation in aesthetics of weaving knitted toe socks, actually, yoga socks providing a decorated bottom nonslip design while simultaneously being functional have received attention on the market. However, current yoga toe socks are limited to only an external nonslip design. As an example, Korean Design Registration No. 30-0837396 discloses a yoga sock which includes openings through which toes are exposable in a front part, an opened instep part, and a nonslip part formed on a bottom surface to prevent a slip and is worn during indoor exercise such as yoga, Pilates, and the like.

An existing single-side nonslip bottom has an effect of strengthening a grip between a floor and a sock by attaching a nonslip member to an outer side of the sock but can not resolve slipping between the sock and a foot. Also, there are problems such as a phenomenon wherein the sock is pulled backward and a phenomenon wherein the foot and sock slip due to the grip between the floor and the sock, and in a severe situation, the sock is folded.

Also, since the nonslip member is attached to a desired position on an outer side of the sock using a conventional method such as a sticker type patch, silk printing, silicone-coating or the like, it is structurally impossible to firmly attach the nonslip member to the sock such that the nonslip member is easily detached. Accordingly, there is a problem that the nonslip member is easily separated from the sock while being washed.

Also, since a conventional nonslip part is not ventilated, the foot sweats a great deal and becomes wet. When the nonslip member is wet with sweat, a water membrane is formed and slipping occurs such that a nonslip function is destroyed.

Also, conventionally, since the nonslip member is manufactured with a uniform thickness and a uniform area and is attached or the nonslip member is attached through silk printing or silicone coating with a uniform thickness and a uniform area, it is structurally impossible to adequately adjust a thickness and a size of the nonslip member.

Meanwhile, pile weave is considered to be essential in exercising socks for hygroscopicity and feet protection. However, it is impossible to apply pile weave to toe socks due to a problem of a current knitting skill.

Due to the above reason, generally, a point sock (linking) formed by separately knitting a toe part and a body part and then connecting the same is the only toe pile sock. However, it is difficult to produce the point sock.

To remedy such problems, as an alternative to a toe sock which is incapable of being pile-weaved, a cushion pad is attached to a toe part using needlework to increase a nonslip effect and a cushioning property. However, in the case of needlework type attachment, durability and grip are low and it is uncomfortable to wear.

Related Design Document: Korean Design Registration No. 30-0837396 (registered on Jan. 26, 2016)

DISCLOSURE

Technical Problem

The present invention is directed to providing a yoga cushion-padded sock in which a cushion pad is attached using a mold pressing method instead of needlework so as to adjust a thickness of the cushion pad while simultaneously attaching the cushion pad to both sides or one side.

The present invention is also directed to providing a yoga cushion-padded sock that is a yoga-exclusive sock in which a cushion pad is attached to a part of a frictional surface during yoga moves so as to strengthen grip with a floor and to complexly provide a shock absorption function and a nonslip quality.

The present invention is also directed to providing a yoga cushion-padded sock in which a cushion pad includes air holes to be smoothly ventilated so as to prevent the cushion pad from becoming wet.

The present invention is also directed to provided a yoga cushion-padded sock capable of completely remedying conventional problems including not only grip between the sock and the floor but also a slipping phenomenon between a foot and the sock, providing a high effectiveness in strengthening performance by increasing a sense of contact with the floor during yoga moves, reducing manufacturing costs to have excellent price competitiveness and durability, and being modifiable into a variety of designs.

Technical Solution

One aspect of the present invention provides a yoga cushion-padded sock that is a yoga sock having openings, through which toes are exposed, and in which a cushion pad is attached to a part of the sock, which is a frictional surface of a sole during yoga moves, through mold pressing so as to provide functions of strengthening grip with a floor, shock absorption, and a nonslip quality, wherein the cushion pad includes a plurality of air holes so as to be smoothly ventilated.

The cushion pad may be attached to each of an inner surface and an outer surface of a toe part and a heel part of a bottom of the sock 10 or attached to any one surface of the inner surface and the outer surface.

The cushion pad may be attached to each of an inner surface and an outer surface of a middle part of the bottom of the sock or attached to any one surface of the inner surface and the outer surface.

Advantageous Effects

According to a yoga cushion-padded sock of the present invention, since a cushion pad is attached using a mold pressing method instead of needlework, it is possible to adjust a thickness of the cushion pad while the cushion may be simultaneously attached to both sides or one side.

Also, as a yoga-exclusive sock, since a patch type nonslip cushion pad is attached to a position corresponding to a frictional surface of a sole during yoga moves, there are effects of strengthening grip with a floor and complexly providing a shock absorption function and a nonslip quality Also, since a plurality of air holes are formed in the cushion pad attached to the sock so as to be smoothly ventilated, it is possible to prevent the cushion pad from becoming wet during exercise and prevent a water membrane from being formed on the cushion pad which destroys or degrades the nonslip function.

Also, there are effects of completely remedying conventional problems including not only poor grip between the sock and the floor but also a slip phenomenon between a foot and the sock, providing a great effect in strengthening performance by increasing a sense of contact with the floor during yoga moves, and reducing manufacturing costs to have price competitiveness, excellent durability, and being modifiable into a variety of designs.

MODES OF THE INVENTION

Hereinafter, technical components of the present invention will be described in detail with reference to the attached drawings.

As basic features of the technical concept, a yoga cushion-padded sock according to the present invention is a yoga sock 10 including opening portions 11 through which toes are exposed as shown in FIGS. 1 to 5. A cushion pad 20 is attached to a part of the sock 10, which is a frictional surface of a sole during yoga moves, through mold pressing so as to provide functions of strengthening grip with a floor, shock absorption, and a nonslip quality. The cushion pad 20 includes a plurality of air holes 21 so as to be smoothly ventilated.

Here, the sock 10 according to the present invention is exclusively used for yoga exercise, and the sock 10 according to the present invention is formed as an incised toe sock including five opening portions 11 at a front thereof so as to allow toes to be exposed.

The patch type nonslip cushion pad 20 mold-adheres to an adequate position on the sock 10, that is, a position corresponding to the frictional surface of the sole during yoga moves, and the cushion pad 20 includes the plurality of air holes 21 to be smoothly ventilated. Here, since the cushion pad 20 includes the plurality of air holes 21 formed to be smoothly ventilated, the cushion pad 20 may be prevented from becoming wet when yoga is practiced such that it is possible to prevent a water membrane from being formed on the cushion pad 20 which destroys or degrades the nonslip function.

In a process of attaching the cushion pad 20 to the sock 10 through mold pressing, a pad molding groove is formed in a mold for attaching the cushion pad 20 to the sock 10. Polyethylene terephthalate (PET) or silicone, which is a raw material of the cushion pad 20, is injected into the pad molding groove of the mold, the mold is inserted into a heater so as to melt the material, the mold is placed on the sock 10 while being turned upside down and is inserted into a lower fixing plate of a press so as to allow the material melted in the heater to come into contact with a pad attachment portion of the sock 10, and the mold is heated and compressed by an upper compression plate of the press to firmly attach the cushion pad 20 to the sock 10 using heat and pressure so as to not be detached therefrom.

The cushion pad 20 having a variety of pattern is firmly attached to a part of the sock 10 which needs strengthening of a grip force with the floor, a shock absorption function, and a nonslip quality through molding as described above.

According to the present invention, the cushion pad 20 is attached to each of an inner side and an outer side of toe and heel parts of a bottom of the sock 10 or attached to any one of the inner side and the outer side.

Figure 1:
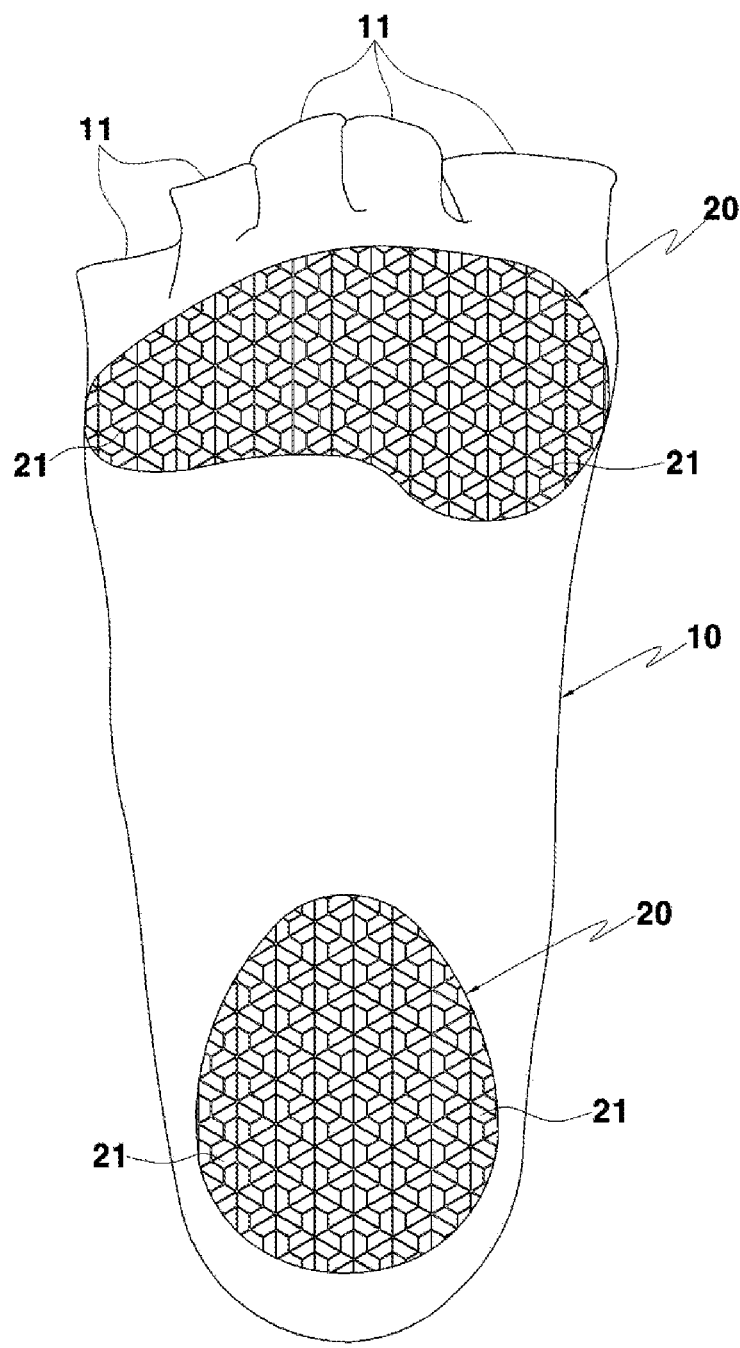
FIG. 1 is a bottom view of a yoga cushion-padded sock according to the present invention.
Figure 2:
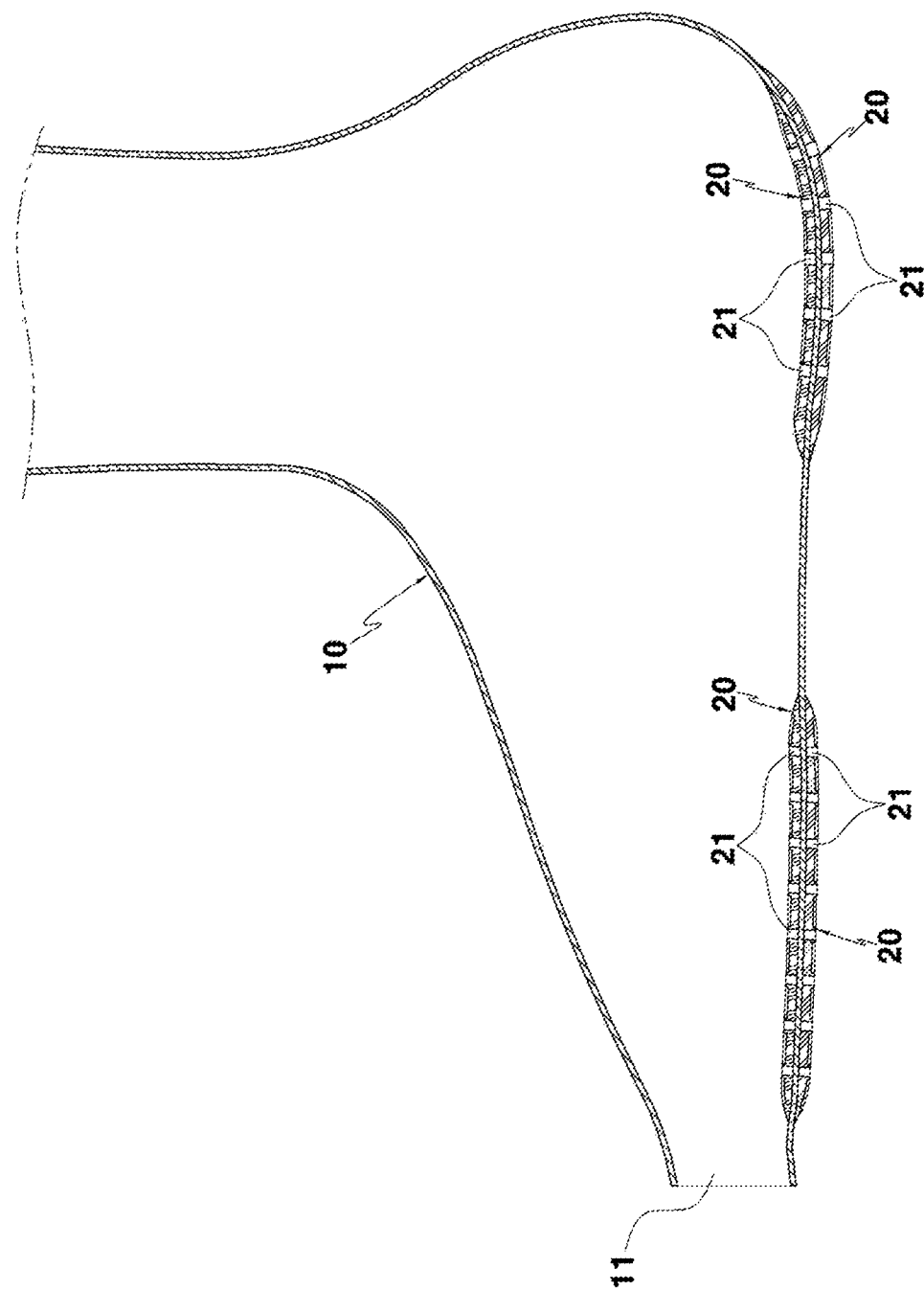
FIG. 2 is a cross-sectional view illustrating a state in which a cushion pad according to the present invention is attached to each of an inner side and an outer side of a sock.

According to one example of the present invention, as shown in FIG. 2, the cushion pad 20 may be attached to each of the inner side and the outer side of the toe and heel parts of the bottom of the sock 10. In this case, since the cushion pad 20 may be attached to each of the inner side and the outer side of the bottom of the sock 10 as shown in FIG. 2 so as to apply a nonslip member to both-sides, it is possible to effectively prevent slipping between the sock 10 and the floor during yoga moves.

Meanwhile, the sock 10 of the present invention is formed as a toe sock including opening portions 11. Since the toe sock is a non-pile-weaved sock, it is possible to apply the nonslip member to both sides using an existing silk screen method. When the nonslip member is applied to both sides using an existing silk screen method, manufacturing costs thereof may be reduced and productivity may be increased.

Figure 3:
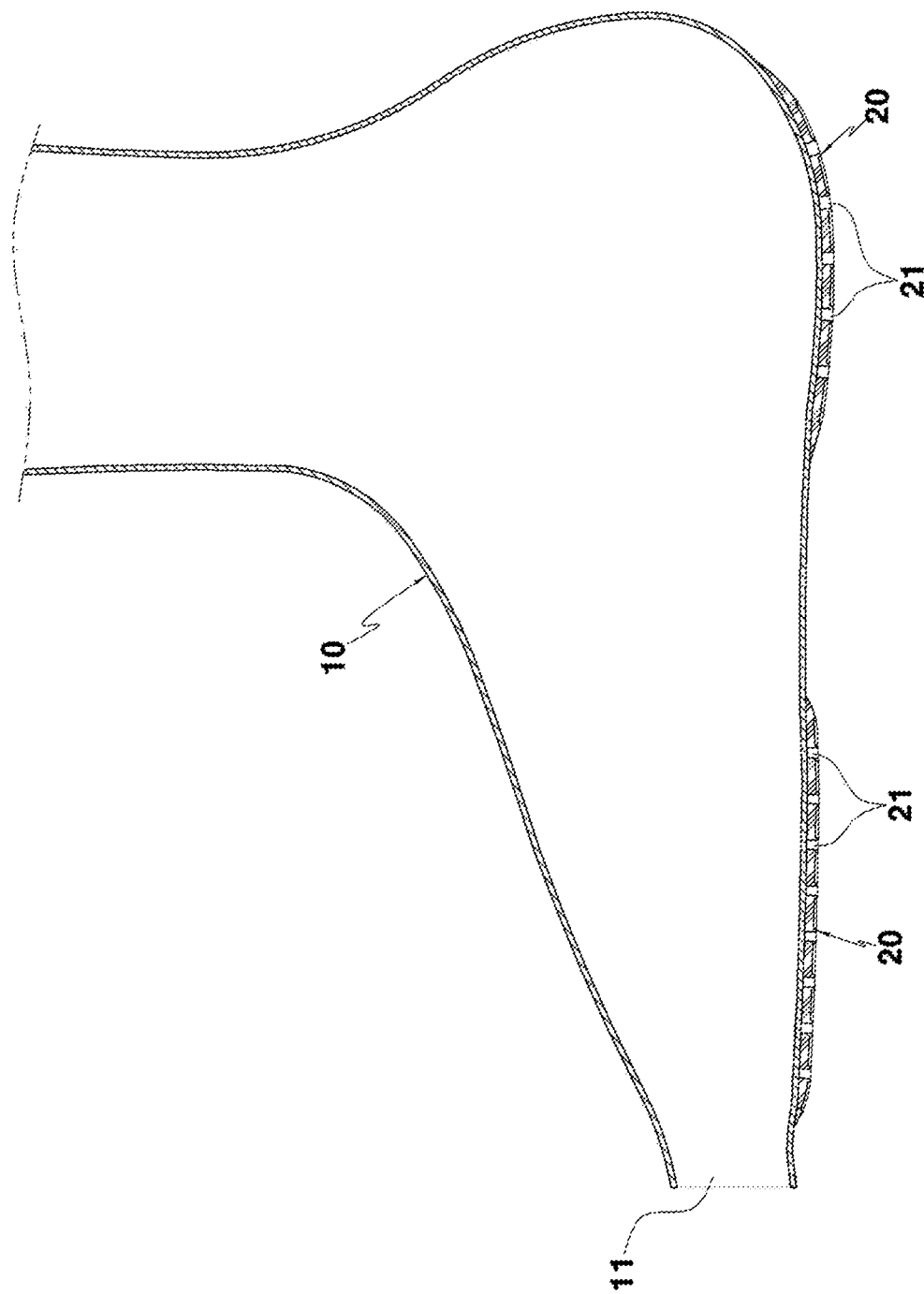
FIG. 3 is a cross-sectional view illustrating a state in which the cushion pad according to the present invention is attached to only the outer side of the sock.
Figure 4:
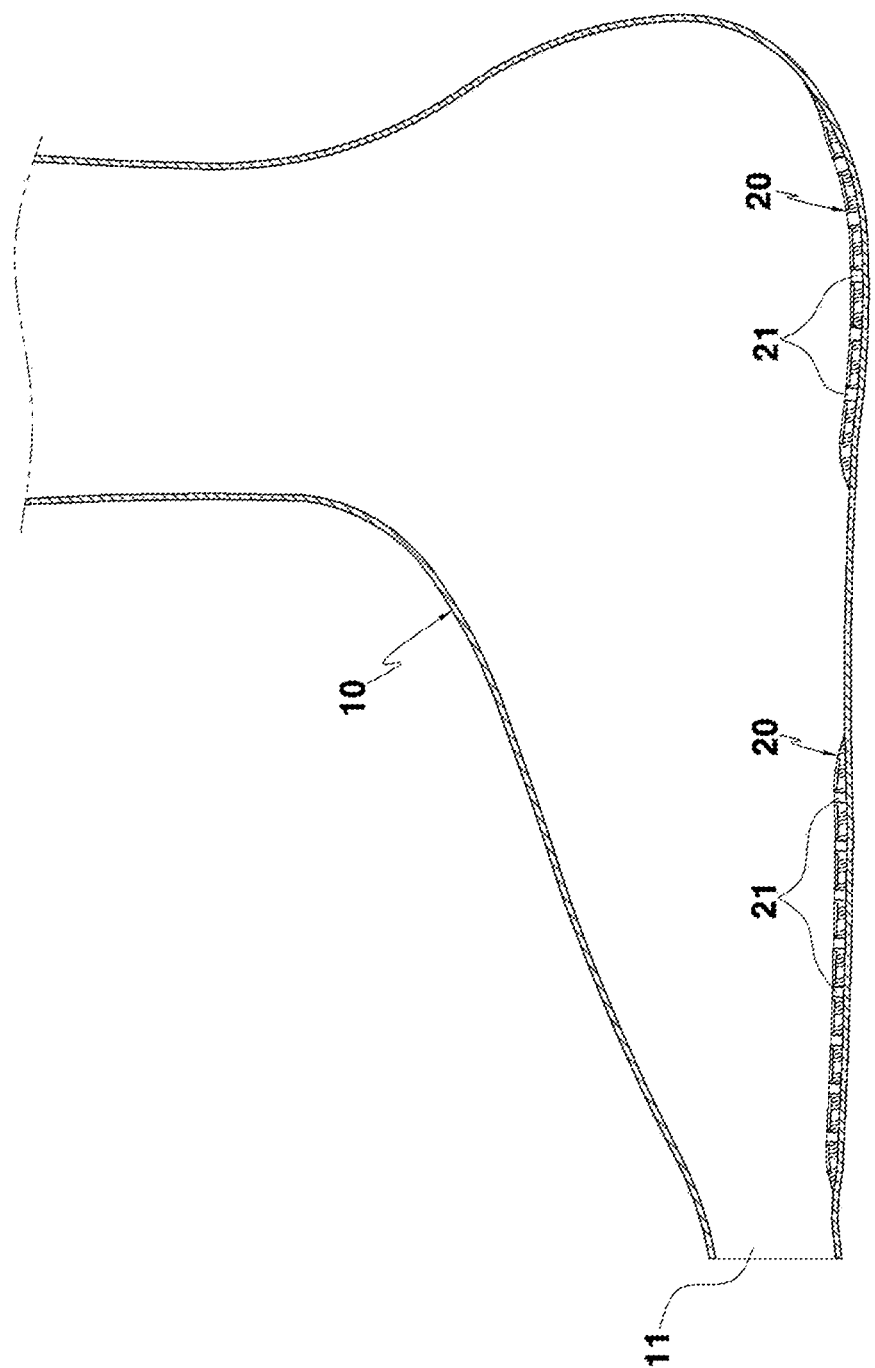
FIG. 4 is a cross-sectional view illustrating a state in which the cushion pad according to the present invention is attached to only the inner side of the sock.

According to one example of the present invention, the cushion pad 20 may be attached to only the outer sides of the toe and heel parts of the bottom of the sock 10 as shown in FIG. 3. Also, according to one example of the present invention, the cushion pad 20 may be attached to only the inner sides of the toe and heel parts of the bottom of the sock 10.

According to the present invention, the cushion pad 20 is further attached to each of an inner side and an outer side of a middle part of the bottom of the sock 10 or further attached to any one of the inner side and the outer side.

Figure 5:
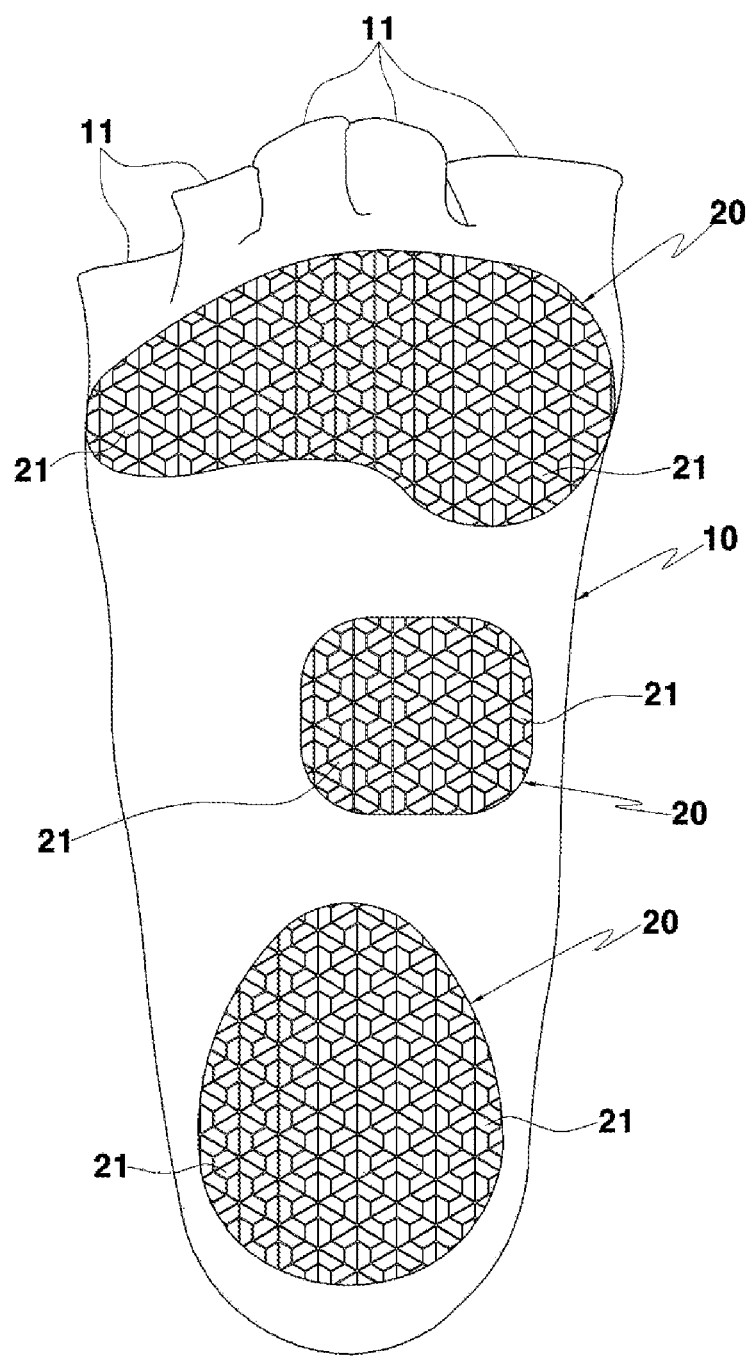
FIG. 5 is a bottom view illustrating a state in which the cushion pad according to the present invention is further attached to a middle part of the sock.

That is, according to another example of the present invention, the cushion pad 20 may be further attached to the outer side of the middle part of the bottom of the sock 10 as shown in FIG. 5. Also, not shown in the drawings, the cushion pad 20 may be further attached to the inner side of the middle part of the bottom of the sock 10. In this case, the cushion pad 20 may be further attached to each of the inner side and the outer side of the middle part of the bottom of the sock 10. Also, the cushion pad 20 may be further attached to only the inner side or the outer side of the middle part of the bottom of the sock 10.

The cushion pad 20 may be attached to the inner side and the outer side of the bottom of the sock 10 as described above. However, in addition, the cushion pad 20 may be further attached to a part which needs a nonslip quality and a shock absorption function of the sock 10.

Accordingly, in the present invention, since the cushion pad 20 is attached using mold pressing instead of a needlework type cushion pad, it is possible to adjust a thickness of the cushion pad 20 while simultaneously attaching the cushion pad 20 to one side or each of both sides.

Also, since the present invention provides the sock 10 for yoga in which the patch type nonslip cushion pad 20 is attached to a position corresponding to the frictional surface of the sole during yoga moves, there are advantages of strengthening grip with the floor and complexly providing a shock absorption function and a nonslip quality.

Also, in the present invention, since the cushion pad 20 attached to the sock 10 includes the plurality of air holes 21 formed to achieve smooth ventilation, there are advantages of preventing the cushion pad 20 from becoming wet during exercise and of preventing a water membrane from being formed on the cushion pad 20 which destroys or degrades the nonslip function.

Also, according to the present invention, there are advantages of completely remedying conventional problems including not only grip between the sock 10 and the floor but also a slip phenomenon between a foot and the sock 10, providing a great effect in strengthening performance by increasing a sense of contact with the floor during yoga moves, reducing manufacturing costs to have excellent price competitiveness and durability, and being modifiable into a variety of designs.

Also, in the present invention, since the cushion pad 20 having a variety of patterns may be firmly attached to the sock 10 using molds, there is an advantage that the cushion pad 20 is not separated from the sock 10 when the sock is washed.

Comparison between the above-described yoga cushion-padded sock of the present invention and yoga socks of an existing company T, company B, and other companies is shown in Table 1 below.

TABLE 1

|  | Yoga cushion-padded sock of the present invention | Yoga sock of company T | Yoga sock of company B | Yoga sock of another company |
| --- | --- | --- | --- | --- |
| Manufacturing method | Mold pressing of bottom cushion pad using heat and pressure | Attaching cushion pad through needlework | Nonslip member on single side of bottom | Nonslip member on single side of bottom |
| Workability | Pressing-attachment using heat and pressure | Needlework | Silk screening on bottom | Silk screening on bottom |
| Durability | Excellent | Average | Average | Poor |
| Advantages | Very excellent nonslip effect and maximized grip using both-side nonslip | Effects of cushioning and nonslip on single side of bottom are more excellent than existing yoga socks | — | — |
| Disadvantages | Increase in working processes | Slight uncomfortable and low durability of sewed cushion | Average durability | Poor durability |

As seen from Table 1, in comparison to the yoga socks of company T, company B, and other companies, in the yoga cushion-padded sock formed using a mold according to the present invention, a cushion pad manufactured using a mold is attached to both sides or any one side of a sock such that the cushion pad is fixed to the sock. Accordingly, it may be seen that a cushion function is improved, durability is not less than an existing needlework type or silk-screen type sock, and an outstanding effect is present in permeability.

| 10: sock | 11: opening portion |
| --- | --- |
| 20: cushion pad | 21: airhole |

The invention claimed is:

1. A yoga cushion-padded sock that is a yoga sock, comprising:
   opening portions configured for toes to be exposed when the sock is worn, and
   a cushion pad attached to a bottom of the sock, which is configured to correspond to a frictional surface of a sole of the sock during yoga poses, through mold pressing so as to provide functions of strengthening grip with a floor, shock absorption, and a nonslip quality,
wherein
the bottom of the sock has a ball part and a heel part,
each of the ball part and the heel part includes an inner surface configured to face toward a sole of a user when the sock is worn and an outer surface configured to face away from the sole of the user when the sock is worn,
the cushion pad includes an inner cushion pad attached to the inner surface, and an outer cushion pad attached to the outer surface, of the ball and heel parts of the bottom of the sock, through molding so as to apply a nonslip member to the inner and outer surfaces,
each of the inner cushion pad and the outer cushion pad includes a plurality of air holes for ventilation, and
the plurality of air holes of the inner cushion pad faces the plurality of air holes of the outer cushion pad.

2. The yoga cushion-padded sock of claim 1, wherein
the bottom of the sock further has a middle part between the ball part and the heel part,
the cushion pad further includes a middle cushion pad attached to at least one of an inner surface or an outer surface, of the middle part of the bottom of the sock.

\* \* \* \* \*